A. G. EMERY.
METHOD OF PRODUCING ARTICLES OF A VULCANIZABLE PLASTIC.
APPLICATION FILED MAR. 12, 1915.
1,193,883.  Patented Aug. 8, 1916.
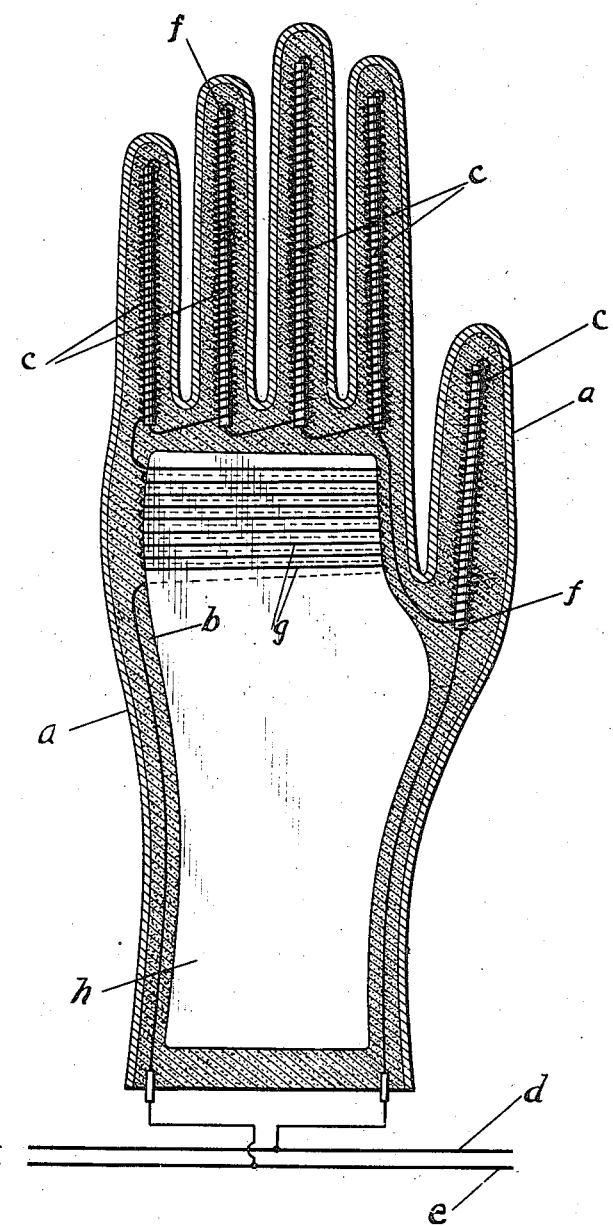

UNITED STATES PATENT OFFICE.

ALBERT G. EMERY, OF BROOKLYN, NEW YORK, ASSIGNOR TO RUBBER REGENERATING COMPANY, A CORPORATION OF INDIANA.

METHOD OF PRODUCING ARTICLES OF A VULCANIZABLE PLASTIC.

1,193,883.          Specification of Letters Patent.        Patented Aug. 8, 1916.

Application filed March 12, 1915. Serial No. 13,856.

*To all whom it may concern:*

Be it known that I, ALBERT G. EMERY, a citizen of the United States, residing at Brooklyn, county of Kings, State of New York, have invented certain new and useful Improvements in Methods of Producing Articles of a Vulcanizable Plastic, of which the following is a full, clear, and exact description.

My invention relates to a method of producing articles of a vulcanizable plastic, and more particularly to improvements in the production of articles by the so-called dipping method.

Heretofore it has been the custom in making articles of rubber or other vulcanizable plastics by the dipping process or method, to submerge or dip a form having the desired configuration in a bath of the plastic brought to a fluid or semi-fluid state by means of a volatile solvent. After each submersion or dip of the form, it was exposed to the air for a sufficient interval to allow the solvent to evaporate. When the form had been thus dipped and dried a sufficient number of times to insure the accumulation of the plastic material to the desired thickness, the vulcanizable plastic upon the form, was subjected to a vulcanizing treatment.

By my present invention I am enabled to reduce the time required in volatilizing the solvent in the plastic accumulated upon the surface of the form.

This invention consists primarily in the method of producing articles of a vulcanizable plastic embodying therein the steps of dipping a form in a bath of vulcanizable plastic made fluid or semi-fluid by a volatile solvent, and driving said solvent from the plastic material accumulated upon the form by the application of heat thereto from the interior of the forms; and in such other novel steps as are hereinafter set forth and described, and more particularly pointed out in the claims hereto appended.

In the accompanying drawing I have shown a form adapted for use in practising my improved method.

In practising the method of my invention I employ a form the outer contour of which will give the required shape to the article which it is desired to produce. While in the drawing I have shown a glove form my invention is not limited in any sense to the production of gloves or to the use of a form like that shown. This form is dipped in a bath of a vulcanizable plastic, made fluid or semi-fluid by means of a volatile solvent. Ordinarily the plastic is a high grade rubber and the solvent used is a volatile hydrocarbon such as naphtha, benzol, or other similar volatile agent. The form with such of the plastic as has adhered to or accumulated upon the surface thereof is then removed from the bath, and after the usual manipulation to secure the desired distribution of the material thereon the temperature within the mold is raised to a degree where it will rapidly volatilize the solvent in the plastic and thus cause the plastic to quickly dry. Or the form may be continually maintained at the desired temperature, or it may be partially warmed during the dip and its temperature raised subsequent thereto, the essential of the invention being that the heat may be obtained in whole or in part by a direct application of heat to the form instead of subjecting the form with the deposit of the vulcanizable material thereon to a surrounding heated atmosphere. Moreover my invention contemplates a controllable means for heating the form in order that the temperature thereof may be regulated in any desired manner. The form is repeatedly dipped and the plastic accumulated thereon, repeatedly subjected to the action of the desired high temperature from within and through the form until the desired thickness of rubber free of the solvent is secured. All portions of the forms should be subjected to as nearly the required degree of heat as is possible, thus insuring uniformity in the action thereof upon all portions of the plastic upon the form to produce an article having the required thickness at various points.

By the above procedure there will be accumulated upon the surface of the form, a homogeneous layer of the plastic, free from stratification or other undesirable characteristics.

When plastic of the desired thickness has been accumulated upon the form by successive dippings, alternated with applications of heat to the plastic through the form to drive the solvent therefrom, the coated form is subjected to a vulcanizing medium. The article may be removed from the form and cured or partly cured in any preferred manner, such as in soapstone or by what is known as the cold cure, or the article may be semi-cured upon the form, the vulcanization being completed after it has been removed from the form, the article being reversed if desired to facilitate this, and may be cured either by means of heat vulcanization or by the cold cure according to the plastic or plastic composition used in the bath.

The means employed to heat the form is immaterial to my method, it being applied to the form from the interior thereof, so that the heat conductive material of the form will serve to distribute and equalize the heat.

In the accompanying drawing, I have shown a glove form having an outer face $a$ of porcelain or other suitable material adapted to accumulate the plastic while permitting it to be readily stripped therefrom after being vulcanized or semi-vulcanized. This form has a filling or lining $b$ of gypsum or other heat-conductive dielectric material, supporting a plurality of resistance coils $c$ so disposed as to develop heat in all parts of the form. At $d$ and $e$ I have shown the electrical conductors from which current is supplied to the various resistance devices. In this particular design of form shown, each finger portion has a tube $f$ of dielectric or insulating material embedded in the filling therefor, the conductor forming the resistance being passed axially through each tube toward the finger end, and then being coiled about the tube, the wire passing from the end of each coil to and through the next tube. A larger coil $g$ wound upon a core $h$ of plaster of Paris or other suitable material is connected in series with the other coils and suffices to heat the body portion of the form.

I do not wish to be limited to the particular arrangement of the electrical resistance elements illustrated, since the same may be arranged in other ways by those skilled in the art. The size or gage of the wires may be varied at different points to produce a greater or less heating effect at such points, so that the thickness of the article formed at such points may be greater or less according to requirements and also so that the differences in radiation of heat at different points may be compensated for according to the shape and surface area of corresponding parts of the form. This variation may also be attained by providing independent leads to the heating elements at different parts of the form so that the same may be controlled separately. The form may also be made in convenient sections or divisions adapted to permit separate removal of the parts thereof, thus facilitating the removal of the article before curing or after partial curing.

By employing electric currents so localized by varying the size of resistance wire, the number of convolutions of the coils or by sectionalizing the applications of the electric current, the heat may be generated in particular parts of the form according to the relation between the surface area of such parts and their respective volumes. It has heretofore been a defect in such apparatus when supplied with a fluid heating medium that the parts of the form having small volume and relatively large area cooled more rapidly by evaporation than are the parts of large volume and relatively small area. This has been due not only to the shape of such parts, that is whether thin or, on the other hand, more nearly cylindrical or spherical, but to the fact that the volume of objects of similar shapes varies as the cube of their linear dimensions while the surface area varies as the square of such dimensions.

Where a fluid medium has been employed within a form, the small passages in the smaller or flatter parts of the form have not allowed sufficient passage of the heating fluid to heat such parts to the required degree, while the parts having larger or more nearly cylindrical form have been over heated, thus producing uneven evaporation of the solvent.

In my improved method the necessary amount of heat applied to a particular part of the form is proportioned directly to the relation existing between the surface areas and the respective volumes of the parts of the form, thus obviating the defect mentioned.

Having described my invention, what I claim and desire to have protected by Letters Patent is:

1. The method of producing articles of a vulcanizable plastic which comprises, dipping a form into a solution of said plastic in a volatile solvent, supplying localized heat from within said form in varying degrees of intensity according to the relation of the surface area of the parts of the form to their respective volumes, thereby causing equal rates of evaporation from each unit of the entire surface of said form.

2. The method of producing articles of a vulcanizable plastic which comprises, dipping a form into a solution of said plastic in a volatile solvent, generating heat within said form in varying degrees of intensity according to the relation of the surface area of the parts of the form to their respective volumes, thereby causing equal rates of evaporation from each unit of the entire surface of said form.

3. The method of producing articles of a vulcanizable plastic which comprises, dipping a form into a solution of said plastic in a volatile solvent, generating heat within said form in varying degrees of intensity by the production of electric currents in varying degrees of conduction according to the relation of the surface area of the parts of said form to their respective volumes, thereby causing equal rates of evaporation from each unit of the entire surface of said form.

Signed at New York, county of New York and State of New York, this 8th day of March, 1915.

ALBERT G. EMERY.

Witnesses:
VERONICA BRAUN,
BLANCHE V. MOHAN.